(12) United States Patent
Kettunen et al.

(10) Patent No.: US 9,133,983 B2
(45) Date of Patent: Sep. 15, 2015

(54) LUBRICATION SYSTEM AND A WORKING MACHINE

(71) Applicant: Waratah OM Oy, Joensuu (FI)

(72) Inventors: Veikko Kettunen, Outokumpu (FI); Mika Hannonen, Joensuu (FI)

(73) Assignee: DEERE & COMPANY, Moline, IL (US)

( * ) Notice: Subject to any disclaimer, the term of this patent is extended or adjusted under 35 U.S.C. 154(b) by 302 days.

(21) Appl. No.: 13/847,863

(22) Filed: Mar. 20, 2013

(65) Prior Publication Data

US 2013/0248294 A1    Sep. 26, 2013

(30) Foreign Application Priority Data

Mar. 20, 2012  (FI) ...................................... 20125312

(51) Int. Cl.
| | |
|---|---|
| *F16N 7/38* | (2006.01) |
| *A01G 23/091* | (2006.01) |
| *B27B 17/00* | (2006.01) |
| *B27B 17/12* | (2006.01) |

(52) U.S. Cl.
CPC ................ *F16N 7/38* (2013.01); *A01G 23/091* (2013.01); *B27B 17/0091* (2013.01); *B27B 17/12* (2013.01)

(58) Field of Classification Search
CPC ...... F16N 7/39; A01G 23/91; B27B 17/0091; B27B 17/12
USPC .................................... 184/26, 15.1; 144/34.1
See application file for complete search history.

(56) References Cited

U.S. PATENT DOCUMENTS

| | | | |
|---|---|---|---|
| 3,236,036 A | | 2/1966 | Bailey et al. |
| 3,874,432 A | * | 4/1975 | Albright ...................... 144/34.1 |
| 4,016,956 A | | 4/1977 | Karlsson |
| 4,384,599 A | | 5/1983 | Dagenais |
| 4,462,439 A | * | 7/1984 | Dagenais ..................... 144/34.1 |
| 6,324,952 B1 | * | 12/2001 | Daly ............................... 83/169 |
| 6,363,981 B1 | | 4/2002 | Butler et al. |
| 2010/0147628 A1 | * | 6/2010 | Soucy et al. ................. 184/15.1 |
| 2010/0282367 A1 | | 11/2010 | Stevenson et al. |

FOREIGN PATENT DOCUMENTS

| | | |
|---|---|---|
| FI | 915001 A | 5/1992 |
| SE | 1250200 A1 | 11/2012 |
| WO | 9853666 A1 | 12/1998 |
| WO | 2008141411 A1 | 11/2008 |

OTHER PUBLICATIONS

Communication, European Search Report, and Annex in Counterpart European Patent Application No. EP13397504.5 (Jun. 7, 2013) (7 pages).
English Translation of Finnish Office Action in Counterpart Finnish Application No. 20125312 (7 pages) (Jan. 9, 2013).
Finnish Office Action in Counterpart Finnish Patent Application No. 20125312 with Partial English Translation (11 pages) (Jan. 9, 2013).

* cited by examiner

*Primary Examiner* — William E Dondero
*Assistant Examiner* — Robert T Reese

(57) ABSTRACT

The present disclosure relates to a lubricating system for lubricating an implement to be lubricated in the boom system of a working machine, the system comprising a lubricant source which can be installed in a base machine for the working machine and coupled to the implement to be lubricated. The lubricating system further comprises a dispensing unit which can be connected to the implement to be lubricated, for dispensing lubricant to the implement to be lubricated. The present disclosure also relates to a working machine comprising a lubricating system.

14 Claims, 2 Drawing Sheets

LUBRICATION SYSTEM AND A WORKING MACHINE

The present application claims priority to Finnish Patent Application No. 20125312 which was filed on 20 Mar. 2012 and is hereby incorporated by reference herein.

FIELD OF THE DISCLOSURE

The present disclosure relates to a lubrication system for lubricating a work implement in a boom assembly of a working machine. The present disclosure also relates to a working machine, the working machine comprising a boom assembly, and the boom assembly comprising at least one work implement to be lubricated.

BACKGROUND OF THE DISCLOSURE

Document WO 2008/141411 discloses a lubricating system for lubricating the chain saw of a felling head at the end of a boom assembly of a forest machine. This system comprises a grease reservoir, a grease feeder and a grease pump, which are all placed in connection with the engine compartment of the base machine. The feeder is connected to the grease pump in such a way that it supplies grease from the grease reservoir via the inlet of the grease pump to the grease pump. The grease pump is connected to the chain saw to be lubricated, by a hose between the outlet of the grease pump and the chain saw at the end of the boom assembly of the forest machine.

The length of the hose system in the forest machine, from the engine space of the base machine to the work implement placed at the end of the boom assembly, may be even 10 to 15 meters. As a result, there is a delay in the supply of the lubricant by a pump placed in the base machine, between the time of turning on the pump and the time of supply of grease to the chain saw to be lubricated at the end of the boom assembly. Therefore, at times, the chain of the chain saw to be lubricated may need to operate under insufficient lubrication conditions. This will increase the wear of the chain and the guide bar, and at worst, it may cause overheating and damage of the chain saw, because in modern forest machines, the speed of motion of the chain of the chain saw is very high, and when cutting a tree, the chain of the chain saw is pressed towards the edge of the guide bar of the chain saw, wherein those parts of the chain saw which move in relation to each other heat up strongly, unless sufficient lubrication is provided between them. On the other hand, a long hose system dispenses lubricant in excess to the lubrication target although the sawing function is at times not in use, which causes waste of the lubricant.

At present, such lubrication systems are also known, in which the pump and the lubricant reservoir are placed in the work implement (e.g. harvester head) at the end of the boom assembly. In such a solution, as presented in e.g. US 2010/0282367, the supply of lubricant can be made to function better in real time, because the lubricant pump is positioned close to the target to be lubricated. In view of the efficient use of the forest machine, however, it is advantageous that the work implement placed at the end of the boom assembly is as light weight as possible. A lubricating system placed in the work implement will increase the weight of the work implement, particularly if the lubricant reservoir included in the lubrication system is relatively large. On the other hand, if the size of the lubricant reservoir is reduced, the reservoir has to be filled more frequently, which, in turn, is not advantageous in view of the efficiency of the work to be performed with the forest machine.

BRIEF SUMMARY OF THE DISCLOSURE

It is an aim of the present disclosure to introduce a novel lubrication system for a work implement at the end of the boom assembly of a working machine, by means of which the lubricant can be dispensed in real time without delays, but in which the weight of the work implement at the end of the boom assembly is not excessively increased by the lubrication system.

The aim of the present disclosure is achieved with a lubrication system comprising a lubricant source placed in the base machine and, furthermore, a separate dispenser which is smaller than the lubrication source, is placed between the work implement at the end of the boom assembly and the lubricant source in the base machine, is closer to the work implement than the lubrication source, and is smaller and lighter in weight than the lubricant source, which dispenser is supplied with lubricant by the lubricant source in such a way that no interruptions or delays occur in the supply of the lubricant to the target to be lubricated although the dispenser does not have a lubricant reservoir of its own. To put it more precisely, the aim of the present disclosure is achieved with a lubrication system which is characterized in what will be presented in the claims.

As an advantage of the lubrication system, a work implement at the boom assembly of the working machine can be lubricated without a delay and therefore accurately without a lubricant source placed in the work implement at the end of the boom assembly. Furthermore, thanks to the lubrication system, the interval for adding lubricant can be made long, since the size of the lubricant reservoir of the lubricant source placed in the base machine does not have to be limited because the weight of the work implement at the end of the boom assembly would therefore become too heavy.

According to a first aspect of the lubrication system, the dispensing unit is placed closer to the work implement to be lubricated than to the lubricant source.

According to a second aspect of the lubrication system, the dispensing unit is in a device mounted to the end of the boom assembly of the working machine and comprising the work implement to be lubricated.

According to a third aspect of the lubrication system, the dispensing unit comprises a dispensing pump which can be controlled by the control system of the base machine.

According to a fourth aspect of the lubrication system, the dispensing unit comprises a control valve for controlling the dispensing pump.

According to a fifth aspect of the lubrication system, the lubrication system comprises a non-return valve between the lubricant source and the dispensing unit, arranged to prevent the flow of lubricant from the dispensing unit to the lubricant source.

According to a sixth aspect of the lubrication system, the lubricant source comprises a lubricant reservoir, a feeder pump and a pressure switch, and the pressure switch is configured to start the feeder pump when the pressure of the lubricant in the lubricant source drops below a predetermined threshold value.

According to a seventh aspect of the lubrication system, the dispensing unit and the lubricant source can be disconnected from each other.

The working machine comprises a lubrication system according to any of the preceding aspects.

According to the first aspect of the working machine, the working machine is a forest machine which comprises a base machine, a boom assembly and harvester head mounted on it, and the work implement to be lubricated is in the harvester head.

According to the second aspect of the working machine, the base machine comprises a control system for controlling the work implement, and the lubricating system is configured to be controlled by the control system of the work implement.

According to a third aspect of the working machine, the work implement is a chain saw in the harvester head.

According to a fourth aspect of the working machine, the dispensing unit is configured to automatically supply lubricant to the guide bar of the chain saw when the chain saw is operated.

DESCRIPTION OF THE DRAWINGS

In the following, the present disclosure will be described in more detail with reference to the appended drawings, in which.

DETAILED DESCRIPTION OF THE EMBODIMENTS ACCORDING TO THE DRAWINGS

Figure 1:
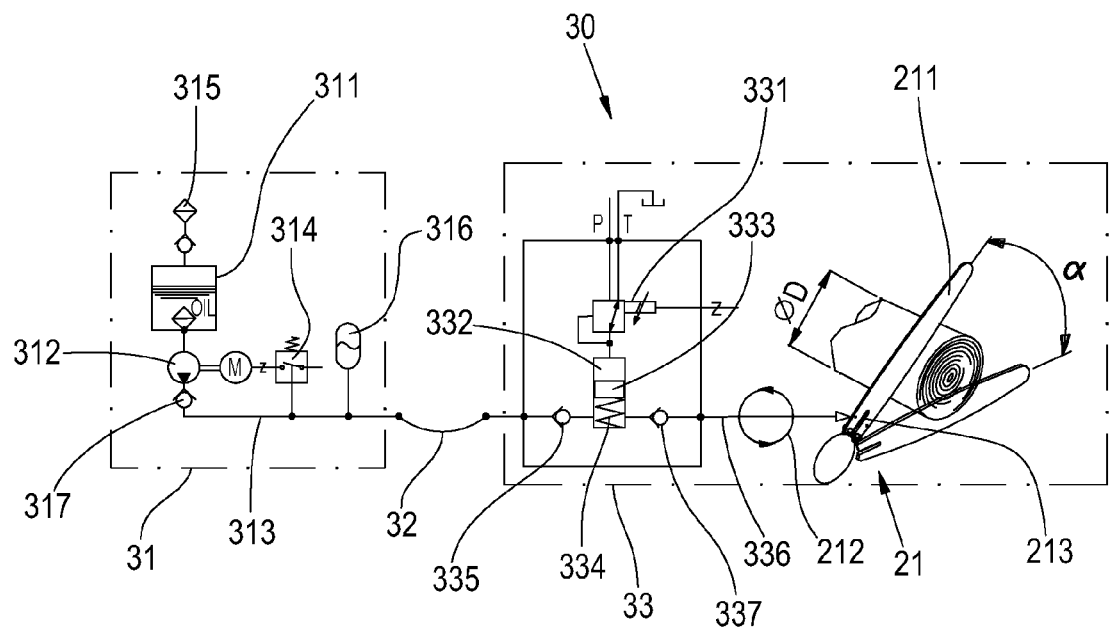
FIG. 1 shows a lubrication system in a schematic view.
Figure 2:
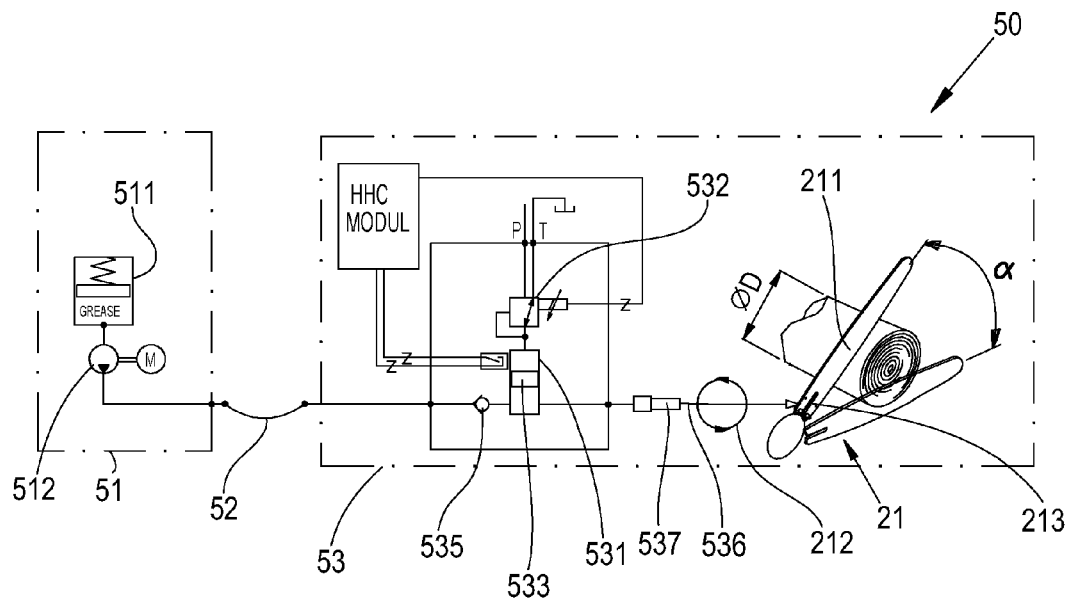
FIG. 2 shows another lubrication system in a schematic view.

FIG. 1 shows schematically an embodiment of a lubrication system. The lubrication system of FIG. 1 can be installed, for example, in a forest machine 10 shown in FIG. 3, where the chain saw 21 in the harvester head 20 at the end 12 of a boom assembly 11 is lubricated with oil. The lubrication system 30 of FIG. 1 comprises a lubricant source 31, a main line 32 and a dispensing unit 33. In the embodiment of FIG. 2, the lubricant source 31 is placed in the base machine 40, and the dispensing unit 33 is placed in the harvesting head 20.

Figure 3:
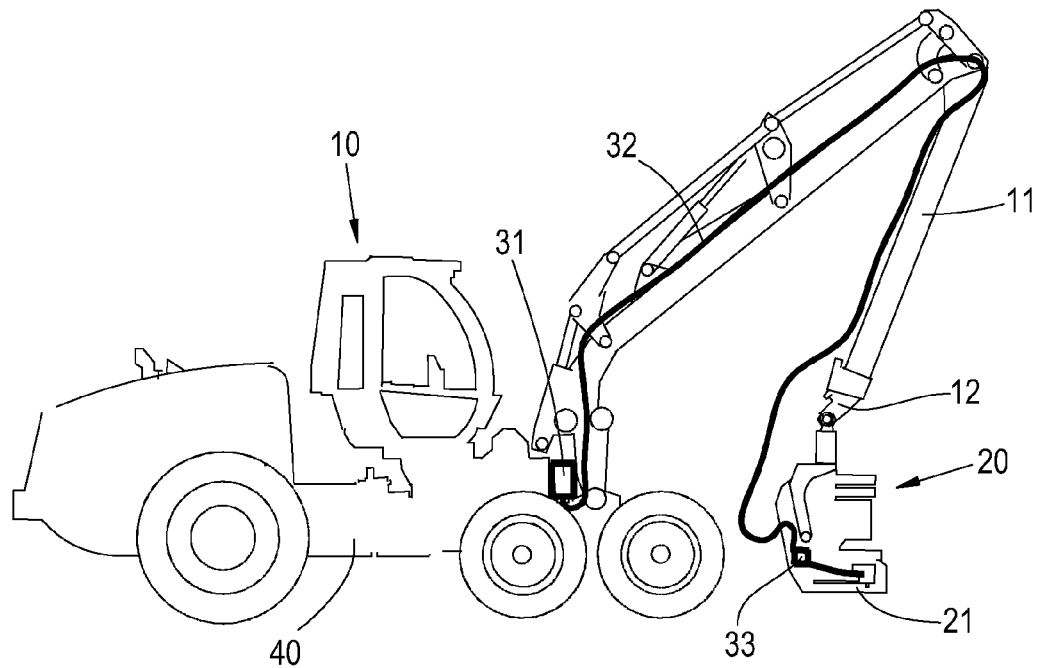
FIG. 3 shows a forest machine on which the lubrication system according to FIG. 1 is mounted.

The lubricant source 31 comprises an oil reservoir 311 for oil used as lubricant, and a feeder pump 312 for pumping the oil. In an application of the type shown in FIG. 1, an advantageous location for the oil reservoir 311 and the feeder pump 312 is, as shown in FIG. 3, for example between the swivelling device and the tilting cylinder of the boom assembly 11. The volume of the oil container 311 is approximately 20 liters, wherein it is sufficient for working as long as for a week, according to estimates based on consumption. The oil reservoir 311 is advantageously filled via bayonet connection 315 in the oil reservoir 311, wherein no litter can enter the lubricating system. The electrically powered feeder pump 312 in or under the oil reservoir 311 is controlled by means of a pressure switch 314. The lubricant source 31 comprises, downstream of the feeder pump 312 and in the same internal line 313, a non-return valve 317 and a pressure accumulator 316 for storing a small amount of oil. The purpose of the non-return valve 317 is to prevent oil from flowing from the pressure accumulator 316 in the direction of the feeder pump 312. From the lubricant source 31, the oil is conveyed to the harvester head 20 along the main line 32. The harvester head 20 is provided with a dispensing unit 33 including a control valve 331 which is a proportional valve, and a dispenser pump 332 which is in this case advantageously constructed with the control valve 33 as an integrated component. The dispenser pump 332 is a pump whose oil space is provided with a return spring 334 for a piston 333, for returning the piston 333 to the initial position when the control flow generated by the control valve 331 ceases. Thanks to this, the dispenser pump 332 is always ready to supply oil to the work implement to be lubricated, i.e. in this case to the chain saw 21, when the control valve 331 receives a control command. Upstream of the dispensing unit 33, there is a non-return valve 335 on the inlet side for preventing the flow of oil from the dispensing unit 33 back to the lubricant source 31, and downstream there is a non-return valve 337 on the outlet side in the feeder pipe 336. The non-return valve 337 is configured to open first by the effect of pressure generated by the dispenser unit 33. As a result, oil cannot flow from the pressure side of the dispenser pump 332 to the feeder pipe 336 when the dispenser pump 332 is not turned on. The feeder pipe 336 is connected to the guide bar 211 of the chain saw 21 via a twist-on connector 212 of the chain saw and a lubrication hole 213 in the guide bar 211.

When the lubrication system 31 according to FIG. 1 is mounted, for example, in the forest machine 10 shown in FIG. 3, the pressure switch 314 controls the use of the feeder pump 312 by switching off the motor of the feeder pump 312 when a predetermined pressure threshold value has been reached. In this way, the feeder pump 312 also takes care that the dispensing unit 33 always contains a sufficient amount of oil to be supplied to the chain saw 21 in the harvester head 20 as needed.

The control valve 331 is controlled by a program included in the control system of the harvester head 20, either by pulses with a given length and period, or alternatively by a proportionally increasing flow. The program starts the dispensing of oil when the chain of the chain saw 21 starts to move, and stops it when the movement of the chain stops, i.e. typically when the cutting of a tree starts and ends. By the program, it is possible to define a given flow of oil to be supplied, for example according to the type of oil used for lubrication. The control valve 331 controls the dispenser pump 332 in such a way that the regulated oil flow is realized as set by the program.

Figure 4:
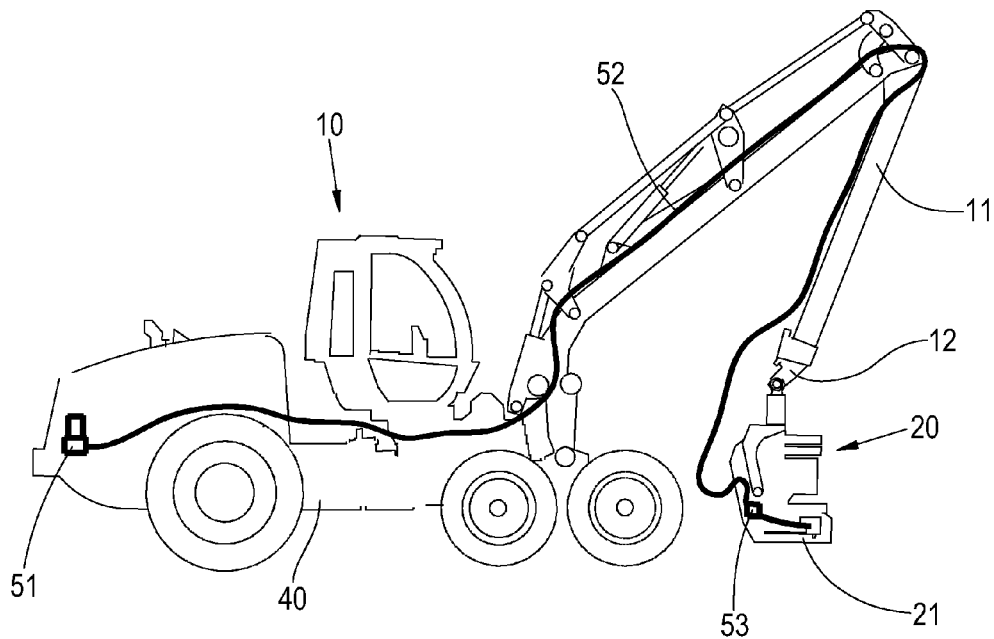
FIG. 4 shows a forest machine in which the lubrication system according to FIG. 2 is mounted.

Another embodiment of the lubrication system is shown schematically in FIG. 2. Also, the lubrication system 50 shown in FIG. 2 can be installed in a forest machine 10 corresponding to that shown in FIG. 1, in the way shown in FIG. 4. In this embodiment, the lubricant used is not oil but a grease which is advantageously a suitable central lubricating grease or, for example, a biodegradable grease (for example, Envirosys™ grease). In this embodiment, the lubricant source 31 suitable for supplying oil in the lubrication system of FIG. 1 is replaced with a lubricant source 51 suitable for supplying grease, and the dispensing unit 31 suitable for dispensing oil is replaced with a dispensing unit 53 suitable for dispensing grease. Although the pressure level needed is higher when grease is used as the lubricant than when oil is used, the main line 52 between the lubricant source 51 and the dispensing unit 53 can be similar in structure to the main line 32 shown in FIG. 1. In the case of FIG. 2, the lubricant source is, however, placed farther from the chain saw to be lubricated (in the engine compartment of the base machine 40) than in the embodiment of FIG. 1, wherein the main line 52 of the embodiment of FIG. 2 is longer than the main line 32 of the embodiment of FIG. 1.

The lubricant source 51 in the base machine 20 comprises a lubricant reservoir 511 and a feeder pump 512. The dispensing unit 53 comprises a piston 533, and the rise of the piston to its uppermost position is controlled by, for example, a sensor of the proximity switch type. On the basis of a signal received by the sensor, the program responsible for controlling the harvester head determines when the feeder pump 512 does not need to pump any more grease from the lubricant source 51. When the amount of grease in the dispensing unit 53 decreases and the piston comes down, the feeder pump 512 is started again.

When grease is used as the lubricant, the location of the lubricant source 51 is preferably in the warm engine compartment of the base machine 40. From there, the grease is conveyed along the main line 52 to the boom assembly 11 and further along the boom assembly 11 to the harvester head 20. In the harvester head 20, the dispensing unit 53 suitable for dispensing grease is placed e.g. in the same location as the oil dispensing unit 33 in the embodiment shown in FIG. 2. The dispensing unit 53 comprises a dispenser pump 531 and a control valve 532, but in this embodiment there is no need for a return spring for the piston 533, because the pressure of the grease is sufficient for returning the piston 533 of the dispenser pump 531. Furthermore, in this embodiment there is only one non-return valve 535 upstream of the dispenser pump 531, because thanks to its viscosity which is higher than that of oil, the grease does not flow by itself from the dispensing unit to the feeder pipe 536. As shown in FIG. 3, also in this case the feeder pipe 536 is conveyed via a twist-on connector 212 and a lubrication hole 213 to the guide bar 211 of the chain saw 21.

When the lubrication system 50 of FIG. 3 is installed in a forest machine 10 according to FIG. 1, the lubricant source 51 supplies grease to the dispensing unit 53 when required by the dispensing unit 53. The pressure level needed is naturally higher for grease than for oil used as the lubricant. The amount of grease is adjusted by the number of impulses per one saw-cut, as well as by a separate dispenser 537 which may also be provided with a control of its own. A single dose from the dispenser 537 is very small, because the consumption of grease is even less than one tenth of the consumption of oil. The grease reservoir 511 of the lubricant source 51 is filled with an electrically powered pump, which comprises a filling hose that is connected to a bayonet connection (not shown in the figures) in the grease reservoir 511 by means of a bayonet connection in the filling hose.

It should be noted that in both of the above-presented embodiments, the main line 32 and 52 comprises a connection point (e.g. a bayonet connection or the like) between the harvester head 20 and the end 12 of the boom assembly, which connection point can be connected in an openable way so that the dispensing unit 33 or 53 in the harvester head 20 can be disconnected from the lubricant source 31 or 51, for example if the harvester head 20 is to be removed from the end 12 of the boom assembly.

In many respects, the lubrication system can be implemented in a way different from the above-presented example embodiments. For example, the proportional valve used as the control valve for the dispensing unit may alternatively be an on-off type proportional valve, or one that is controlled in an on-off manner. The parts of the dispensing unit may be integrated in a single component, or the dispensing unit may be formed of separate components. It is not necessary to monitor the amount of lubricant in the target to be lubricated (e.g. the chain saw), but the dispensing of the lubricant may be arranged to operate, for example, on a time basis.

In the case of embodiments using grease as the lubricant according to FIG. 3, the supply of lubricant can also be monitored, for example, by a pressure sensor placed close to the target to be lubricated, in the lubrication line, to detect a pressure change outside certain limits, if no grease enters the target to be lubricated, or the amount of grease supplied is too small with respect to the setting value. Furthermore, the lubrication system may comprise a heating device for heating the lubricant in the lubricant reservoir (for example, a heating resistor placed in the reservoir), for heating the lubricant in cold weather. The lubricant does not need to be mineral oil or grease, but alternatively also other lubricants can be used, such as turnip rapeseed oil or e.g. an aqueous lubricating fluid with suitable additives for lowering the freezing point and to improve the lubricating properties. Also other parts of the lubrication system, as well as their operation, can be implemented in a variety of ways.

In the above-presented embodiment examples, the lubrication system was installed in a forest machine equipped with a harvester head, where it secures the lubrication of a work implement at the end of the boom assembly of a working machine (the chain saw in a harvester head). The lubrication system is also suitable for other forest machines equipped with a boom assembly, or also such other working machines that have a work implement placed at the end of a boom assembly and requiring continuous or intermittent lubrication during the operation of said working machine. Consequently, the present disclosure is not limited to the embodiment examples presented above, but it may vary within the scope of the appended claims.

The invention claimed is:

1. A lubrication system for lubricating a work implement at a boom assembly of a working machine, the system comprising a lubricant source configured to be installed in a base machine of the working machine and configured to provide pressurized lubricant, wherein the lubrication system further comprises a dispensing pump which is arranged to receive lubricant from the lubricant source and is configured to be connected to the implement to be lubricated, for pressurizing and dispensing lubricant, received from the lubricant source, to the implement to be lubricated.

2. The lubrication system according to claim 1, wherein the dispensing pump be controlled by a control system of the base machine.

3. The lubrication system according to claim 2, wherein the dispensing pump comprises a control valve for controlling the dispensing pump.

4. The lubrication system according to claim 1, wherein the lubrication system comprises a non-return valve between the lubricant source and the dispensing pump, arranged to prevent the flow of lubricant from the dispensing unit to the lubricant source.

5. The lubrication system according to claim 1, wherein the lubricant source comprises a lubricant reservoir, a feeder pump and a pressure switch, and the pressure switch is configured to start the feeder pump when the pressure of the lubricant in the lubricant source drops below a predetermined threshold value.

6. The lubrication system according to claim 1, wherein the dispensing pump and lubricant source can be disconnected from each other.

7. The lubrication system according to claim 1, wherein the lubrication system is included in a working machine, the working machine comprises a boom assembly, and the boom assembly comprises at least one work implement to be lubricated.

8. The lubrication system according to claim 7, wherein the dispensing pump is placed closer to the implement to be lubricated than the lubricant source.

9. The lubrication system according to claim 8, wherein the dispensing pump is in a device mounted at the end of the boom assembly of the working machine and comprising the work implement to be lubricated.

10. The lubrication system according to claim 7, wherein the working machine is a forest machine comprising a base machine, a boom assembly and a harvester head mounted on the boom assembly, and the work implement to be lubricated is in the harvester head.

11. The lubrication system according to claim 10, wherein the base machine comprises a control system for controlling the work implement, and the lubrication system is configured to be controlled by the control system of the work implement.

12. The lubrication system according to claim 10, wherein the work implement is a chain saw in the harvester head.

13. The lubrication system according to claim 12, wherein the dispensing unit is configured to supply lubricant automatically to the guide bar of the chain saw when the chain saw is operated.

14. A lubrication system for lubricating a work implement in a boom assembly of a working machine, the system comprising a lubricant source which can be installed in a base machine of the working machine and coupled to the implement to be lubricated, wherein the lubricating system further comprises a dispensing unit which can be connected to the implement to be lubricated, for dispensing lubricant to the implement to be lubricated, the lubricant source comprises a lubricant reservoir, a feeder pump and a pressure switch, and the pressure switch is configured to start the feeder pump when the pressure of the lubricant in the lubricant source drops below a predetermined threshold value.

* * * * *